United States Patent Office 3,446,778
Patented May 27, 1969

3,446,778
BLOCK COPOLYESTER CONTAINING CRYSTALLIZABLE POLYMERIC UNITS AND RUBBERY POLYESTER UNITS
Richard C. Waller, Silver Lake, and Max H. Keck, Cuyahoga Falls, Ohio, assignors to The Goodyear Tire & Rubber Company, Akron, Ohio, a corporation of Ohio
No Drawing. Filed Aug. 4, 1964, Ser. No. 387,489
Int. Cl. C08g 17/003, 39/10
U.S. Cl. 260—75       7 Claims

ABSTRACT OF THE DISCLOSURE

The invention relates to block copolyester resins comprised of blocks of high melting crystallizable polymeric polyesters linked to blocks of low melting rubbery polymeric polyesters. Elastic fibers and films can be made from the resins by melt extrusion.

---

This invention relates to new copolymer resins. More particularly the invention relates to new block copolymer resins and to shaped articles prepared from such compositions.

Elastic articles such as fibers or threads have heretofore been made from rubber, from certain kinds of polyurethane resins and specific types of polyether resins. These elastic fibers of the prior art are satisfactory for some uses but in general they have poor solvent resistance, are easily yellowed and decomposed by ultraviolet light and are not resistant to bleaching agents used in ordinary laundry operations.

It is an object of this invention to provide new copolymer resins. Another object of the invention is to provide new elastic fibers which have good hydrolytic stability, elasticity at low temperatures, resistance to ultra-violet light and resistance to ordinary laundry bleaching agents.

The resins of this invention are block polymers in which the blocks are two different condensation polymers, one of which is a high melting crystallizable material and the other a low melting tractable rubbery material. The high melting crystallizable block is a material having a melting point above 175° C. and a molecular weight of from at least about 1,000 to about 15,000. The rubbery block is a material having a melting point below 60° C., a low second order transition temperature and a molecular weight at least equal to the molecular weight of the crystalline block.

The blocks of the composite copolymers are (a) hard blocks that are readily crystallizable materials having predominantly aromatic polyester characteristics, and (b) tractable blocks that are essentially non-crystallizable materials having predominantly aliphatic polyester characteristics. The term "predominantly aliphatic polyester characteristics" means that these blocks are amorphous or low melting, soluble at room temperature in the variety of solvents, and are rubbery or tractable at room temperature.

The essentially non-crystallizable aliphatic blocks contribute elasticity and plastic flow properties. The crystallizable blocks provide physical bonds between molecules which are thought to be in the nature of crystalline cross links due to intramolecular forces such as Van de Walls forces. These regulate plastic flow and provide high melting point, stress stability and high tensile strength desirable in textile fibers.

A high density of the physical bonds provided by the crystalline cross links imparts the property of "snap" or very fast retraction of a stretched fiber when it is released from tension and also contribute to the property of stress stability. This high density of such bonds is obtained by chemically combining relatively low molecular weight crystallizable blocks with intermediate to high molecular weight tractable rubbery blocks.

In addition to physical bonds between molecules, chemical bonds or chemical cross links also contribute to snap and to stress stability. Such chemical bonds can be obtained by incorporating in the rubbery block a small amount of a polyfunctional monomer which also improves stress decay properties.

More particularly the resins of this invention are block copolyesters in which blocks of at least one crystallizable hydroxyl-terminated polyester having an intrinsic viscosity of from about 0.1 to about 0.5 are joined to blocks of at least one hydroxyl-terminated tractable "rubbery" resin having an intrinsic viscosity of from about 0.2 to about 0.95, the intrinsic viscosity of the final composition being in the range of from 0.75 to 1.75, preferably in the range of 1.00 to 1.35 measured in 60/40 phenol-tetrachloroethane mixed solvent at 30.0° C. Thus the composite block copolyester resins contain units of one or more crystallizable polyester resins joined to units of one or more tractable rubbery resins by an interlinking process described in detail hereinafter. The ratio of the crystallizable blocks to the amorphous rubbery blocks in the polymer are in the range of from 10 to 65 of crystallizable block to 90 to 35 of the rubbery block on a weight basis.

The final polymers have a melting point of at least 150° C. as determined by use of a Kofler hot stage microscope. Preferably the melting point of the final polymer should be 175° C. or higher. In order to produce a final polymer having a melting point of at least 150° C. the crystalline component used has a melting point of at least 175° C. the melting point of the final polymer is determined by the melting point of the crystalline polymer and to some extent by the ratio of the crystalline polymer blocks to the tractable rubbery polymer blocks. Thus, in a block copolymer having a melting point of about 200° C. in which the crystalline component comprises 10 percent by weight of the final polymer and the tractable rubbery polymer comprises 90 percent by weight of the final polymer, the melting point of the crystalline block should be in the range of from about 245 to 250° C. For the preparation of a 25/75 (ratio of crystalline block to rubbery block) copolymer having a final melting point of at least 200° C. blocks of crystalline polymer having a melting point in the range of from 225 to 235° C. are used. When high molecular weight crystalline blocks are used, the block copolyesters formed are higher melting than copolyesters formed using low molecular weight crystalline polyester blocks.

The block copolymers of the present invention are prepared by mixing the crystallizable blocks in molten state with the tractable rubbery blocks also in molten state and reacting them with the interlinking agent. They can be prepared by mixing the blocks in molten state and then adding interlinking agents and reacting the mixture, or if desired, one type of polymer block can be melted, reacted with the interlinking agent and then the second type of block added and reacted. In the latter method, the block copolymer is conveniently prepared by heating the tractable rubbery block by itself to melt it, adding the interlinking agent, reacting it with available hydroxyl groups of the rubbery block, and then adding crystallizable block and causing it to react. For convenience in preparing the block copolymer by mixing blocks in molten state, the melting point of the crystalline block should be below about 250 to 260° C. Melting points of polymers having crystalline melting points that are inconveniently high can be adjusted to a desired point by incorporating in the polymer a modifying ingredient which can be an acid unit or a glycol unit different from the acid or glycol units in the high melting polymer.

The block copolymers of the invention can also be prepared by interlinking the crystallizable blocks and the tractable rubbery blocks in solution. In this method the crystalline blocks and the tractable blocks are dissolved in a suitable solvent and the interlinking agent is added. When the reaction is completed the block copolymer can be recovered from the solvent by precipitation or by evaporation of the solvent or by other suitable methods. Fibers can be made directly from solution of the block copolymer by solution spinning methods, if desired. Various solvents can be used for the preparation and spinning of the block copolymers. Representative examples of solvents that can be used are diphenyl methane, diphenyl ether, dichlorobenzene and dichloroethyl benzene.

Representative examples of high melting crystalline polymers which are useful as blocks of the block copolyesters of the invention are polymeric ethylene terephthalate, neopentyl terephthalate, neopentyl 2,2-dimethyl malonate, ethylene 2,6-naphthalate, tetramethylene terephthalate, tetramethylene 2,6-naphthalate, trimethylene 2,6-naphthalate, 1,4-cyclohexylene dimethylene terephthalate, and copolyesters, such as copolyesters of ethylene terephthalate containing at least 80 mol percent of ethylene terephthalate, such as the 95/5, 90/10, 85/15 and 80/20 ethylene terephthalate-ethylene isophthalate copolyesters, ethylene terephthalate-ethylene adipate copolyesters, and ethylene terephthalate-ethylene hexahydroterephthalate copolyesters, tetramethylene terephthalate-tetramethylene azelate copolyesters containing at least 80 mol percent of tetramethylene terephthalate, 1,4-cyclohexylene dimethylene terephthalate-azelate copolymers containing 70 to 90 mol percent of 1,4-cyclohexylene dimethylene terephthalate, copolyesters of ethylene 2,5- and 2,6-naphthalate containing from 80 to 90 mol percent of the ethylene naphthalate, such as ethylene 2,5-naphthalateethylene azelate and ethylene 2,6-naphthalate-ethylene azelate copolyesters. These polyester blocks can be derived from various dicarboxylic acids and various glycols. Representative examples of such acids are terephthalic acid, isophthalic acid, hexahydroterephthalic acid, the naphthalic acids, such as 2,6-, 2,7-, 2,8-, 1,5- and 1,4-naphthalene dicarboxylic acids, 2,2-dimethyl malonic acid and other such acids which form high melting polyester resins. Examples of glycols are ethylene glycol, propylene glycol, tetramethylene glycol, neopentyl glycol, 1,4-cyclohexane diol, 1,4-cyclohexane dimethanol and other such glycols.

Generally the crystallizable polyester structure contains aromatic rings and has a melting point above 200° C. High melting polymers containing other components can also be used, particularly polyesters containing components such as 2,2-dimethyl malonic acid and 2,2-dimethyl propane diol, which polyesters have melting points above 234° C.

In contrast to the high melting point of the crystalline polymer blocks the tractable rubbery polymer blocks should have a melting point below about 60° C. and preferably below about 45° C. In addition to having a low melting point the tractable rubbery polymer must be compatible with the crystalline polymer. Generally rubbery blocks containing at least 20 percent of aromatic dicarboxylic acid linkages are compatible with the high melting crystalline polymer blocks. Representative examples of tractable rubbery blocks are selected from the group consisting of copolyesters of at least one phthalic acid selected from the group consisting of terephthalic acid and isophthalic acid with a straight chain polymethylene glycol having from 4 to 10 carbon atoms in the chain and a straight chain aliphatic dicarboxylic acid having from 6 to 12 carbon atoms in the chain, the phthalic acid units comprising from 60 to 20 mol percent of the acid units in the copolyester, and the aliphatic acid units comprising from 40 to 80 percent of the acid units in the copolyester and copolyesters of tertiary butyl isophthalic acid with terephthalic acid, isophthalic acid and mixtures thereof with a polymethylene glycol having from 4 to 10 carbon atoms in the chain and a straight chain aliphatic dicarboxylic acid having from 6 to 12 carbon atoms in the chain, the tertiary-butyl isophthalic acid units in the copolyester comprising from 5 to 50 mol percent of the phthalic acid units in the copolyester, the phthalic acid units including the tertiary-butyl isophthalic acid units comprising from 60 to 20 mol percent of the acid units in the copolyester and the aliphatic dicarboxylic acid units comprising from 40 to 80 mol percent of the acid units in the copolyester.

For the preparation of these polyester blocks, various acids and glycols can be used. Representative examples of acids suitable for use are adipic acid, suberic acid, azelaic acid, sebacic acid, dodecandioic acid, dimer acid made by Emery Industries, which is reported to be essentially a C36 dibasic acid, isophthalic acid, substituted isophthalic acid, for example, tertiary butyl isophthalic acid, terephthalic acid, hexahydroterephthalic acid, hexahydroisophthalic acid, and naphthalic acids such as 2,6-, 2,7-, 2,8-, 1,5-, and 1,4-naphthalene dicarboxylic acid and mixtures thereof.

Representative examples of glycols that can be used to prepare these polyester blocks are tetramethylene glycol, pentamethylene glycol, heptamethylene glycol, octamethylene glycol, hexamethylene glycol, nonamethylene glycol, decamethylene glycol, neopentyl glycol, 2,5-hexane diol, 1,4-cyclohexane diol, 1,4-cyclohexane dimethanol, diethylene glycol and triethylene glycol. It is preferred to use glycols having a relatively long chain.

In fibers for certain applications a low stress decay is desirable. The term "stress decay" is used in this specification to mean the percent loss in stress in a fiber one minute after it has been elongated to 50 percent, the elongation having been carried out at a rate of 100 percent per minute. It has been found that a small amount of a polyfunctional modifying agent incorporated in the polyester gives improved stress decay properties. If too much of the polyfunctional agent is incorporated in the polymer the stress decay properties of the fibers of the polymer are deteriorated. Thus, it has been found that if as much as 1.7 mol percent or more of the polyfunctional agent, such as trimethylol propane based on the total number of mols of acid in the rubbery block is used, the properties of the polymer are considerably inferior to one containing a lesser amount. Thus, the rubbery blocks may contain up to about 1.7 but the amount used will preferably be between 0.75 and 1.5 mol percent based on the total acid components in the rubbery block.

When polyfunctional compounds having a functionality of greater than 3 are used, the mol percent used will be proportionately less. Representative examples of suitable polyfunctional compounds that can be used are polyhydroxy compounds, such as trimethylol propane, glycerine, pentaerythritol and polyfunctional acids, such as trimesic acid and pyromellitic acid.

Various interlinking agents can be used to join the crystalline blocks and tractable rubbery blocks to form the block copolyesters. Representative examples of such interlinking agents are azelaoyl bis-T-caprolactam, terephthaloyl-bis-butyrolactam, 2,5-dichloro terephthaloyl bis-N-caprolactam, sebacoyl-bis-N-succinimide, terephthaloyl-bis-N-caprolactam and sebacoyl-bis-N-phthalimide. The amount of interlinking agent used will depend on the number of reactive end groups present on the polymer blocks and the molecular weight desired in the product. The higher the molecular weight of the polymer blocks used the fewer reactive end groups they will contain and the less interlinking agent will be needed to join them to form high molecular weight polymers.

The reactions by which the individual polymer blocks used in the invention are prepared are, in general, carried out in accordance with known techniques, thus the selected blocks are prepared from dicarboxylic acids or ester forming derivatives thereof, and glycols. They are conveniently prepared by the ester interchange method in which a lower alkyl ester of the acid is reacted with the glycol under ester interchange conditions to form the glycol esters which are polymerized by condensation with elimination of glycol to form the polymer of the desired molecular weight terminated by a reactive end group. The individual block can also be prepared by reacting free acids with the glycol or with glycol esters and condensing the product to form the polymer block of desired molecular weight. The composite block polymer is prepared by joining the selected blocks with an interlinking agent which is used in an amount sufficient to produce a final block polymer having a high molecular weight.

The following examples illustrate the invention and show how the resins and fibers can be prepared.

(A) PREPARATION OF REPRESENTATIVE CRYSTALLINE BLOCKS

Example 1

22.5 pounds of tetramethylene glycol, 22.0 pounds of dimethyl terephthalate and 14.996 grams of litharge were charged into a stainless steel vessel which was fitted with a stirrer, a distillation head and a nitrogen inlet tube. Nitrogen gas was slowly passed through the reaction vessel. The mixture was reacted at about 245° C. until the theoretical amount of methanol had distilled out. The mixture was then transferred to a stainless steel polymerization vessel which was also set up with a stirrer, distillation head and a nitrogen gas inlet tube. The pressure in the system was gradually reduced and the temperature was raised to about 248° C. After the pressure in the system reached 0.5 millimeter of mercury pressure, the mixture was reacted for 15 minutes at 248° C. and was then extruded, granulated and stored under dry conditions. The intrinsic viscosity of the polymer was 0.220.

Example 2

An 85/15 1,4-cyclohexylene dimethyl terephthalate-azelate copolymer was prepared as follows: 327.2 grams of dimethyl terephthalate, 778 grams of 1,4-cyclohexane-dimethanol and 0.115 gram of zinc acetate were charged with a stainless steel reactor of the type used in Example 1 and reacted at 140 to 210° C. at atmospheric presusre until the theoretical amount of methanol had distilled out. 56 grams of azelaic acid were then added and heating was resumed at 210 to 220° C. until the theoretical amount of water had distilled out of the mixture. An additional 0.11 gram of zinc acetate was added and the mixture was polymerized by condensation for about 90 minutes at 0.5 millimeter of mercury pressure while the temperature was increased from 210° to 260° C. The resulting polymer had an intrinsic viscosity of 0.265 and had a melting point of about 267° C.

B. PREPARATION OF REPRESENTATIVE TRACTABLE RUBBERY BLOCKS

Example 3

6.89 pounds of hexamethylene glycol, 1.39 pounds of dimethyl isophthalate, 0.32 pound of dimethyl terephthalate, 16.9 grams of trimethylolpropane and 0.3477 gram of zinc acetate were charged into a 12-liter three-neck flask which was fitted with a stirrer, distillation head, nitrogen gas inlet tube and a thermometer. Nitrogen gas was slowly passed into the reaction flask. The ester interchange reaction was carried out at a batch temperature of about 245° C. until the theoretical amount of methanol had distilled out. At this point 3.34 pounds of azelaic acid were added and the mixture was heated and stirred at about 245° C. until the theoretical amount of water distilled from the mixture. Then 0.3477 gram of zinc acetate was added and stirred into the mixture.

Approximately 2,000 grams of the above product were placed in a three-liter three-neck flask which was fitted with a thermometer, nitrogen gas inlet tube, stirrer and distillation head. The mixture was heated to 190 to 260° C. as the pressure in the system was reduced to 0.2 millimeter of mercury pressure. The condensation reaction was carried out for a period of three hours at 260° C. and 0.2 millimeter of mercury pressure. The polymer formed was an extremely viscous oil at 40° C. and an opaque putty-like solid at room temperature. It had an intrinsic viscosity of 0.391.

Example 4

Pentamethylene terephthalate - pentamethylene isophthalate-pentamethylene azelate copolymer modified with one mol percent of trimethylol propane per mol of acid used was prepared as follows: 39.6 grams of dimethyl terephthalate, 158.5 grams of dimethyl isophthalate, 383 grams of pentamethylene glycol, 2.1 grams of trimethylolpropane and 0.080 gram of zinc acetate were reacted as described in Example 3 until the theoretical amount of methanol and distilled out of the mixture. Then 135.4 grams of azelaic acid were added and the mixture was stirred and heated as the temperature of the mixture was raised from 155 to 185° C. The theoretical amount of water obtainable from the reactants distilled out of the mixture. At this point 0.10 gram of zinc acetate was added. The mixture was then polymerized by condensation reaction as in Example 3. The product was a viscous material having an intrinsic viscosity of 0.338.

C. PREPARATION OF COMPOSITE BLOCK COPOLYMER BY INTERLINKING CRYSTALLINE BLOCKS AND TRACTABLE RUBBERY BLOCKS

Example 5

A tractable polymer block was prepared as follows: 247.5 grams of dimethyl terephthalate, 989.5 grams of dimethyl isophthalate, 2719 grams of 1,6-hexanediol and 10.5 grams of trimethylol propane (0.75 mol percent based on the mols of acid reactants used) and 0.55 gram of zinc acetate were charged into a stainless steel reactor and reacted under conditions used in Example 3. When the theoretical amount of methanol had distilled out of the mixture, 846 grams of azelaic acid were added and the mixture was heated and stirred until the theoretical amount of water distilled out. Then 0.55 gram of zinc acetate was added. The mixture was polymerized by heating at 265° C. and 1.5 millimeters of mercury pressure for 2.5 hours. The product had an intrinsic viscosity of 0.499.

Example 6

A rubbery block was prepared as follows: A five-liter three-neck flask, fitted with stirrer, distillation head, nitrogen inlet tube and thermometer was charged with 69.7 grams of terephthalic acid, 279 grams isophthalic acid, 406 grams Emery Industries dimer acid (3389R), 10.3 grams trimethylol propane and 1240 grams 1,6-hexanediol. Nitrogen gas was passed into the flask to provide a nitrogen atmosphere. The mixture was stirred and heated over a temperature range of 145° to 238° C. 253 millimeters of water distilled out of the mixture. 0.325 gram of a manganese ester interchange catalyst was added. The pressure in the system was reduced and the mixture was then reacted at 175 to 257° C. under a pressure of 0.2 millimeter of mercury pressure for 5 hours. The product was a rubbery block polymer having an intrinsic viscosity of 0.340. This polymer block did not crystallize at room temperature.

Example 7

A glass reaction vessel in the shape of a tube approximately 35 centimeters long having a side arm and equipped with an inlet tube and a stirrer was charged with 52 grams of the rubbery polymer prepared in Example 3 and 17.7 grams of a tetramethylene terephthalate homopolymer prepared as in Example 1 which had an intrinsic viscosity of 0.179. Nitrogen gas was slowly passed through the inlet tube into the reactor and the mixture was heated and stirred for 10 minutes at 250° C. under a nitrogen atmosphere. Then 5.5 grams of terephthaloyl-bis-N-butyrolactam were added with rapid stirring. 45 minutes after the lactam had been added the mixture was very viscous. At this point the pressure in the system was reduced to about 1 millimeter of mercury pressure and butyrolactam was distilled from the reaction mixture. The polymer remaining in the tube was a block copolymer which had an intrinsic viscosity of 0.785. Fibers made from a melt of the block copolymer were strong and rubbery.

Example 8

26 grams of the rubbery block prepared in Example 3 and 8.7 grams of tetramethylene terephthalate homopolymer prepared as in Example 1, having an intrinsic viscosity of 0.179, were reacted with 4 grams of azelaoyl-bis-N-caprolactam at 250° C. using the procedure used in Example 5. The block copolymer formed had an intrinsic viscosity of 0.832. Fibers drawn from a melt of the copolymer resin were strong and had rubbery characteristics.

Example 9

54 grams of the rubbery polymer block prepared in Example 3, 18 grams of the tetramethylene terephthalate homopolymer, prepared as in Example 1, having an intrinsic viscosity of 0.179 and 8 grams of sebacoyl-bis-N-phtalimide were reacted according to the procedure of Example 5 at 250° C. for 25 minutes. The block copolymer formed had an intrinsic viscosity of 1,240. Fibers made from a melt of the copolymer were tough, snappy and rubber-like.

Example 10

15 grams of the 85/15 copolymer of 1,4-cyclohexylene dimethylene terephthalate-azelate prepared in Example 2 and 45 grams of a rubbery polymer of hexamethylene terephthalate-isophthalate-azelate prepared as in Example 3 having an intrinsic viscosity of 0.314 were reacted with 5 grams of terephthaloyl-bis-N-caprolactam at 265° C. After 18 minutes of reaction time the mixture was very viscous. After distilling out the caprolactam, the polymer was removed from the reactor. It had an intrinsic viscosity of 1.053 and a melting point of 235° C. Fibers made from a melt of the copolymer were strong, snappy and rubber-like.

Example 11

23 grams of the copolyester block, prepared in Example 5, were mixed at 250° C. with 42 grams of tetramethylene terephthalate polymer prepared in Example 1. When mixing was complete, 5.5 grams of terephthaloyl-bis-N-caprolactom were added with rapid stirring at 250° C. The product was a block copolymer having an intrinsic viscosity of 0.822 and a melting point of 225° C. This block copolymer contained 65 percent by weight of crystallizable block. It was spun into fibers which, after orientation, had an elongation at break of 185 percent and a tenacity of 1.1 grams per denier. A 5-pound quantity of this polymer was extruded onto a vinyl-covered wire. The wire was aged for four days in an air oven at 150° C. At the end of this time the coating was still strong and flexible. It had not developed any visible cracks.

Example 12

A 30/70 block polymer of blocks of 90/100 ethylene terephthalate-isophthalate, and blocks of hexamethylene terephthalate-isophthalate-azelate modified with trimethylol propane, was prepared using the procedure described in Example 9. It had an intrinsic viscosity of 0.824 and a melting point of 210° C. Fibers made from a melt of the copolymer were strong and very rubber-like.

Example 13

A block copolymer of blocks of 15/85 tetramethylene terephthalate and blocks of pentamethylene terephthalate-pentamethylene isophthalate-pentamethylene azelate modified with trimethylol propane was made according to the following procedure: 3.2 grams of tetramethylene terephthalate homopolymers prepared as in Example 1 having an intrinsic viscosity of 0.137 and 18 grams of the rubbery block copolymer of Example 4 were melt mixed at 250° C. in a small glass reactor of the type used in Example 5. When mixing was complete the addition of small increments of terephthaloyl bis-N-caprolactam was begun, using quantities of from 0.1 to 0.3 gram. After a total of 3.0 grams of the lactam had been added, the melt viscosity of the polymer was quite high. The pressure in the system was reduced to about 0.5 millimeter of mercury pressure and caprolactam was distilled out of the mixture. Then the polymer was removed from the reaction tube. The block copolymer formed had an intrinsic viscosity of 1.343. It was made into monofilaments by melt spinning. The monofilament produced were oriented. They were strong, had rubber-like properties and showed a stress decay of only 14.24 percent.

Example 14

270 grams of the rubbery copolymer of Example 3 were melt blended with 90 grams of tetramethylene terephthalate prepared as in Example 1 which had an intrinsic viscosity of 0.179. The mixture was heated to 230° C. and 35 grams of terephthaloyl-bis-N-caprolactam interlinking agent were added. After 25 minutes of reaction time at about 236° C. an additional 1.25 grams of interlinking agent were added. After 10 minutes more of reaction time at 236° C. the pressure in the system was reduced to about 1 millimeter of mercury pressure and caprolactam was distilled from the molten polyester. After 5 minutes under these conditions the pressure in the system was restored to atmospheric pressure and the polymer was extruded from the reaction vessel. The intrinsic viscosity of the polymer produced was 1.247. It was made into fibers by melt spinning. The fibers were oriented and heat treated. They had the following characteristics:

Tenacity at 50% elongation __gram per denier__ 0.0158
Tenacity at 200% elongation _____do____ 0.1570
Tenacity at break _____do____ 0.3762
Percent stress decay (1 min. at 50% elongation) _ 7.37
Percent elongation at break _____ 382

Example 15

270 grams of a rubbery copolymer of the type made in in Example 3 having an intrinsic viscosity of 0.391 were charged into a small reaction vessel and heated to 150° C. under atmospheric pressure. 31 grams of terephthaloyl-bis-N-caprolactam were added with vigorous stirring. The reaction temperature was increased from 150° to 222° C. over a 28 minute period. Then 90 grams of polymeric tetramethylene terephthalate prepared as in Example 1 were added and the temperature was raised from 220° to 250° C. over a 10 minute period. The melt viscosity of the mixture increased rapidly during this period. Over a 10 minute period, while maintaining a reaction temperature at 250° C. the pressure in the system was gradually reduced from atmospheric pressure to 0.1 millimeter of mercury pressure to distill out caprolactam. The system was then restored to atmospheric pressure by the addition of $N_2$ gas and the extremely viscous polymer was extruded. The intrinsic viscosity of the product was 1.315 and crystalline melting point was 214° C.

Example 16

43 grams of the rubbery block prepared as described in Example 5 and 7.6 grams of polymeric ethylene terephthalate having a nintrinsic viscosity of 0.10 were charged into a small glass reaction vessel and melted and mixed at 280° C. When the mixture appeared to be homogeneous, the temperature was reduced to 265° C. and 5 grams of terephthaloyl-bis-N-caprolactam were added in six incremental additions over a period of 13 miuntes. Then the pressure in the system was reduced to about one millimeter of mercury pressure and caprolactam was distilled out of the mixture. Then the polymer was removed from the reaction tube. The product was a block copolyester having an intrinsic viscosity of 0.889. Fibers of the copolyester which were melt-spun and then oriented had an elongation at break of 465 percent.

Example 17.—Effect of polyfunctional agent on physical properties

Eighteen grams of a rubbery block prepared as described in Example 4 having an intrinsic viscosity of 0.436 which contained 1 mol percent of trimethylol propane, based on the mols of acid units in the polyester, were reacted with 3.2 grams of palymeric tertamethylene terephthalate prepared as in Example 1 having an intrinsic viscosity of 0.137 and 1.65 grams of terephthaloyl-bis-N-caprolactam in the manner described in Example 5. The resulting 15/85 block copolymer had an intransic viscosity of 1.343. Fibers made from the copolymer had a stress decay of 14.1 percent.

Fibers of similar polyesters containing no trimethylol propane had a stress decay value of 21 percent.

Example 18

270 grams of the rubbery block prepared in Example 6 were reacted with 90 grams of polymeric tetramethylene terephthalate having an intrisnic viscosity of 0.179 and 35 grams of terephthaloyl-bis-N-caprolactam in the manner described in Example 13. The block copolyester obtained had an intrinsic viscosity of 1.006. This composition was spun into fibers, which, after orientation, had an elongation at break of 370 percent and a tenacity of 0.36 gram per denier.

The elastic fibers of the present invention have excellent resistance to the degradative effects of weather as shown by data obtained in Weatherometer Testing Machine tests tabulated below.

Weatherometer resistance

| Sample: Block polyester | Tenacity (grams/denier) |
| --- | --- |
| Initial | 0.45 |
| 170 hours | 0.267 |
| 400 hours | 0.214 |

The fibers of the present invention are highly resistant to staining by oils and grease. They are also resistant to degradation by chlorine-containing bleaching agents as shown by the following data.

POLYESTER EXPOSED TO BLEACHING SOLUTION CONTAINING 2 TABLESPOONS OF A LAUNDRY BLEACHING SOLUTION¹ PER QUART OF WATER

| Sample | Color | Tenacity (Grams/Denier) |
| --- | --- | --- |
| Block Polyester | White | 0.502 |
| Block Polyester—15 Min. Bleach at 140° F | do | 0.43 |
| Block Polyester—2 Days Bleach at 100° F | do | 0.44 |

¹ The solution used was a regular laundry bleaching solution which was a water solution containing 5¼ percent of sodium hypochlorite as the active bleaching agent.

The block copolyesters of this invention can be used to prepare flexible and elastic filaments, bristles, fibers of greatly improved dyeability, films, flexible coatings, melt adhesives, wire coatings, coatings for felt or paper, and binders for laminates. These block copolyesters can be molded into various shapes or may be extruded into films, rods and tubing. Amorphous films are made by extrusion and quenching of the hot film according to known techniques. The film can also be uniaxially oriented or, if desired, can be biaxially oriented or multiaxially oriented. The oriented films can be heat set by heating at elevated temperatures while holding the film under tension.

Other uses include the preparation of staple fiber blends containing about 5 to 25 percent by weight of elastic staple fiber and 95 to 75 percent by weight of a hard staple fiber. Such blends can be used in manufacturing stretch apparel, such as bathing suits, girdles, socks, brassieres, suits, leotard-type sportswear, underwear, sport shirts, sweaters and dresses. Other uses will be in the manufacturing of elastic (form-fitting) slip covers, sheets, mattress coverings and upholstery. The inelastic hard staple to be mixed with the elastic block copolyesters of this invention may be such as cotton, silk, rayon, linen, wool, acrylic polymers and copolymers, nylon and polyester fibers such as polyethylene terephthalate and poly 1,4 cyclohexylene dimethylene terephthalate.

Fibers made from resins of the invention can be prepared by melt extrusion and by spinning from solution in a suitable solvent. Such fibers can be oriented and are usually oriented by cold drawing. If desired, the fibers can be heat set by heating them at elevated temperature while maintaining them under tension according to known practices. The fibers have a high sticking temperature, high tensile recovery and low stress decay.

While certain representative embodiments and details have been shown for the purpose of illustrating the invention it will be apparent to those skilled in this art that various changes and modifications may be made therein without departing from the spirit or scope of the invention.

What is claimed is:

1. A composition comprising a block polymer having an intrinsic viscosity of from 0.8 to 1.75 in which the blocks are (a) units of linear crystallizable tetramethylene terephthalate homopolyester having an intrinsic viscosity of from 0.1 to 0.3 and (b) units of an essentially linear rubbery hexamethylene terephthalate-isophthalate aliphatic dicarboxylate copolyester having an intrinsic viscosity of 0.2 to 0.95 and in which the terephthalic acid units comprise from 3 to 12 percent of the total acid units in the copolyester, the isophthalic acid units comprise from 18 to 27 percent of the total acid units in the copolyester, the remainder of the acid units in the copolyester being aliphatic dicarboxylic acid units, said copolyester being modified with from about 0.75 to about 1.5 mol percent of trimethylol propane units, based on the total acid units in the copolyster, the (a) units and the (b) units in the composition being interlinked with an interlinking agent selected from the group consisting of N-acyl-polylactams and N-acyl-polyimides, the (a) units comprising from 20 to 30 percent by weight of the composition, the remainder of the composition being (b) units, said composition having a melting point of from about 190° to 210° C.

2. A process of preparing a polymer capable of being formed into elastic fibers which comprises mixing (a) a performed tetramethylene terephthalate polyester having an intrinsic viscosity of 0.1 to 0.3 with (b) a hexamethylene terephthalate-isophthalate-azelate copolyster in which the terephthalic acid units comprise 6 percent of the acid units in the copolyester, the isophthalic acid units comprise 24 percent of the acid units in the copolyester, the remainder of the acid units being azelaic acid units, said copolyester being modified with 1.0 mol percent of trimethylol propane based on the total mols in the acid units, heating the mixture to a temperature above the melting point of the tetramethylene terephthalate polymer and maintaining it at this temperature until the mixture is molten, adding terephthaloyl-bis-N-caprolactam in the amount of about 8 percent by weight based on the total weight of the two polymers, mixing and reacting the mixture until it attains a high melt viscosity and then reducing the pressure in the system to about 0.1 millimeter of mercury pressure, distilling out the caprolactam formed by the decomposition of the terephthaloyl-bis-caprolactam and recovering the polymeric material formed.

3. A process of preparaing an elastic polymer which comprises mixing and reacting a tractable rubbery polyester derived from a dicarboxylic acid, said polyester having a melting point below about 60° C. having an intrinsic viscosity of from 0.2 to 0.95 with an interlinking agent selected from the group consisting of N-acyl polylactams and N-acyl polyimides, then adding a crystallizable polyester resin derived from a dicarboxylic acid and having an intrinsic viscosity of from 0.1 to 0.5 and a melting point of at least about 175° C. and reacting the mixture to form a composite block copolyester having an intrinsic viscosity of from about 0.75 to 1.75.

4. The process of claim 3 in which the crystallizable polymer is reacted with the tractable polymer and interlinking agent at a temperature above the melting point of the crystallizable polymer block.

5. The process of claim 3 in which the tractable rubbery polyester resin and the crystallizable polyester resin are dissolved in a solvent, the interlinking agent is added to the solution and reacted with the dissolved resins to form a composite block copolyester resin.

6. A composition comprising a block copolyester in which the blocks are (a) units of a crystallizable substantially aromatic polymeric polyester derived from a dicarboxylic acid, said polyester having a melting point at least about 175° C. having an intrinsic viscosity of from 0.1 to 0.5 and (b) units of a tractable rubbery polymeric polyester derived from a dicarboxylic acid and having an intrinsic viscosity of from 0.2 to 0.95 and a melting point below about 60° C. and said polyester being modified with from about 0.75 to about 1.5 mol percent of a polyfunctional compound selected from polyhydroxy compounds and polycarboxylic acids having a functionality of at least 3, based on the total number of mols of acid units in the polyester, the ratio of (a) to (b) in the composition being in the range of from 10:65 to 90:35, the intrinsic viscosity of the blocks of crystallizable polymeric polyester being lower than the intrinsic viscosity of the blocks of the tractable polyester, the composition having a melting point of at least 150° C. and an intrinsic viscosity of from about 0.75 to about 1.75 measured in a 60/40 phenol-S-tetrachloroethane mixed solvent at 30.0° C.

7. A composition comprising a block copolyester in which the blocks are (a) units of at least one crystallizable polymeric polyester resin derived from a dicarboxylic acid, said resin having a melting point of at least about 175° C. having an intrinsic viscosity of from 0.1 to 0.5 and (b) units of at least one tractable rubbery polymeric polyester derived from a dicarboxylic acid and having an intrinsic viscosity of from 0.2 to 0.95 and a melting point below about 60° C., the ratio of (a) to (b) in the composition being in the range of from 10:65 to 90:35, the intrinsic viscosity of the blocks of crystallizable polyester being lower than the intrinsic viscosity of the blocks of the tractable polyester, the composition having a melting point of at least 150° C. and an intrinsic viscosity of from about 0.75 to about 1.75 measured in a 60/40 phenol-S-tetrachloroethane mixed solvent at 30.0° C. in which the (a) units of crystallizable polyester are selected from the group consisting of polymeric ethylene terephthalate; polymeric neopentyl 2,2-dimethyl malonate; polymeric tetramethylene terephthalate; copolyesters of ethylene terephthalate-ethylene isophthalate, ethylene terephthalate-ethylene alipate and copolyesters of ethylene terephthalate-ethylene hexahydroterephthalate which contains at least 80 mol percent of ethylene terephthalate; copolyesters of ethylene 2,6 naphthalate-ethylene azelate containing from 80 to 90 mol percent of ethylene 2,6-naphthalate; copolyesters of ethylene 2,5-naphthalate-ethylene azelate containing from 80 to 90 mol percent of ethylene 2,5-naphthalate; and 1,4-cyclohexylene dimethylene terephthalate-1,4-cyclohexylene dimethylene-azelate copolymers containing 70 to 90 mol percent of 1,4-cyclohexylene dimethylene terephthalate and the (b) units of tractable rubbery polyester are selected from the group consisting of copolyesters of at least one phthalic acid selected from the group consisting of terephthalic acid and isophthalic acid with a straight chain polymethylene glycol having from 4 to 10 carbon atoms in the chain and a straight chain aliphatic dicarboxylic acid having from 6 to 12 carbon atoms in the chain, the phthalic acid units comprising from 60 to 20 mol percent of the acid units in the copolyester, and the aliphatic acid units comprise from 40 to 80 percent of the acid units in the copolyester and copolyesters of tertiary butyl isophthalic acid with terephthalic acid, isophthalic acid and mixtures thereof with a polymethylene glycol having from 4 to 10 carbon atoms in the chain and a straight chain aliphatic dicarboxylic acid having from 6 to 12 carbon atoms in the chain, the tertiary-butyl isophthalic acid units in the copolyester comprising from 5 to 50 mol percent of the phthalic acid units in the copolyester, the phthalic acid units including the tertiary-butyl isophthalic acid units comprising from 60 to 20 mol percent of the acid units in the copolyester and the aliphatic dicarboxylic acid units comprising from 40 to 80 mol percent of the acid units in the copolyester, said tractable rubbery polyesters containing from about 0.75 to 1.5 mol percent of a polyhydric alcohol unit based on the total number of mols of acid units in the composition.

References Cited

UNITED STATES PATENTS

| 3,296,335 | 1/1967 | Blaschke | 260—75 |
| 3,331,890 | 7/1967 | Caldwell | 260—860 |
| 2,570,895 | 10/1951 | Wilson | 260—857 |
| 2,682,526 | 6/1954 | Flory | 260—857 |
| 2,827,359 | 10/1958 | Schollick et al. | 260—860 |
| 2,936,396 | 5/1960 | Pricopio et al. | 260—857 |
| 3,057,824 | 10/1962 | Le Bras | 260—75 |

FOREIGN PATENTS

| 816,106 | 7/1959 | Great Britain. |
| 509,925 | 7/1955 | Canada. |

WILLIAM H. SHORT, *Primary Examiner.*

E. M. WOODBERRY, *Assistant Examiner.*

U.S. Cl. X.R.

117—128.4; 260—7.5, 9, 78, 857, 860, 862